United States Patent [19]
Riding

[11] Patent Number: 5,102,975
[45] Date of Patent: Apr. 7, 1992

[54] LIQUID CRYSTALLINE POLYCARBONATE FROM DIHYDROXY BIPHENYL AND DIHYDROXY DIPHENYL ETHER

[75] Inventor: Geoffrey H. Riding, Castleton, N.Y.

[73] Assignee: General Electric Company, Pittsfield, Mass.

[21] Appl. No.: 508,759

[22] Filed: Apr. 12, 1990

[51] Int. Cl.$^5$ .............................................. C08G 64/06
[52] U.S. Cl. .................................... 528/204; 528/196; 528/198
[58] Field of Search ..................... 528/204, 198, 196

[56] References Cited

U.S. PATENT DOCUMENTS

| | | | |
|---|---|---|---|
| 4,439,578 | 3/1984 | Kim et al. ............................. | 524/538 |
| 4,831,105 | 5/1989 | Schissel ................................ | 528/204 |
| 4,845,184 | 7/1989 | Langer et al. ........................ | 528/193 |
| 4,847,351 | 7/1989 | Schissel et al. ...................... | 528/193 |

*Primary Examiner*—Harold D. Anderson
*Attorney, Agent, or Firm*—Hedman, Gibson & Costigan

[57] ABSTRACT

Polycarbonates are provided exhibiting anisotropic properties in the melt. Transesterification of diphenyl carbonate is effected in the melt with a mixture of 4,4'-dihydroxybiphenyl and 4,4'-dihydroxyphenylether. The polymer readily forms high strength fibers from the melt.

9 Claims, No Drawings

LIQUID CRYSTALLINE POLYCARBONATE FROM DIHYDROXY BIPHENYL AND DIHYDROXY DIPHENYL ETHER

BACKGROUND OF THE INVENTION

1. Field of the Invention

The present invention relates to liquid crystalline polycarbonates, and more particularly relates to liquid crystalline polycarbonates derived from diphenyl carbonate, 4,4'-dihydroxybiphenyl and 4,4'-dihydroxyphenylether.

2. Description of Related Art

Polycarbonate resins exhibiting liquid crystalline properties have been prepared in the melt by a transesterification reaction between diphenyl carbonate and mixtures of methyhydroquinone and 4,4'-dihydroxybiphenol, see Schissel, U.S. Pat. No. 4,831,105. Schissel discloses that the polycarbonates are resistant to solvents.

SUMMARY OF THE INVENTION

The present invention involves liquid crystalline polycarbonates which are capable of forming an anisotropic melt and which are the reaction products of 4,4'-dihydroxybiphenyl and 4,4'-dihydroxyphenylether and diphenyl carbonate. The polymers exhibited liquid crystallinity at approximately 350° C. and above, readily formed high strength fibers from the melt and were insoluble in solvents such as dichloromethane.

DETAILED DESCRIPTION OF THE INVENTION

The present invention involves aromatic polycarbonates which exhibit liquid crystalline properties and which are prepared by reacting a mixture of 4,4'-dihydroxybiphenyl and 4,4'-dihydroxyphenylether with diphenylcarbonate via a melt process.

The 4,4'-dihydroxybiphenyl also referred to as biphenol can be represented by the formula:

The 4,4'-dihydroxyphenylether can be represented by the formula:

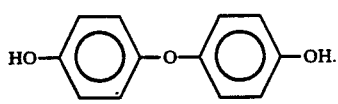

The diphenyl carbonate can be represented by the formula:

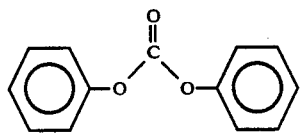

The polycarbonate of the invention forms an isotropic melt consisting essentially of first units of the formula:

chemically combined with second units of the formula:

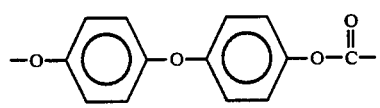

where the first units are present in the polycarbonate at a level of from about 50 mole percent to 80 mole percent based on the total moles of first units and second units, more preferably about 60 mole percent to 75 mole percent thereof, and most preferably 70 mole percent thereof; and second units being present at a level of from about 20 mole percent to 50 mole percent based on the total moles of first and second units present in the polycarbonate, more preferably from 25 mole percent to 40 mole percent thereof, and most preferably 30 mole percent thereof.

The polycarbonate is made by melting a mixture of 4,4'-dihydroxybiphenyl, 4,4-dihydroxyphenylether and diphenyl carbonate under an inert, nonoxidizing atmosphere such as a nitrogen atmosphere, at a temperature range of from 200° C. to 380° C. The mixture can be agitated to effect the removal of phenol during the transesterification reaction. The diphenylcarbonate can be employed at a level of from 50 mole percent to 55 mole percent based on the total moles of 4,4'-dihydroxybiphenyl, 4,4'-dihydroxyphenylether and diphenyl carbonate. During transesterification, a vacuum can be used in combination with agitation, such as achieved with the use of an extruder reactor, or stirrer to facilitate the removal of phenol.

The 4,4'-dihydroxybiphenyl is preferably present at a level of from about 50 mole percent to about 80 mole percent based on the total moles of 4,4'-dihydroxybiphenyl and 4,4'-dihydroxyphenylether reacted to form the polycarbonate, more preferably the 4,4'-dihydroxybiphenyl is present at a level of from 60 mole percent to 75 mole percent and most preferably is present at a level of 70 mole percent thereof, and the 4,4-dihydroxyphenylether is preferably present at a level of from about 20 mole percent to 50 mole percent based on the total moles of 4,4'-dihydroxybiphenyl and 4,4'-dihydroxyphenylether reacted, more preferably at a level of from 25 mole percent to 40 mole percent and most preferably at a level of about 30 mole percent thereof.

In order that those skilled in the art will be better able to practice the present invention, the following examples are given by way of illustration and not by way of limitation.

EXAMPLES

A mixture of 50.21 grams (a slight excess) of diphenyl carbonate, 28.55 grams of biphenol, and 13.28 grams of dihydroxyphenylether were reacted in the presence of LiOH catalyst ($2.5 \times 10^{-5}$ moles) at a temperature of 200° C. for 1 hour, followed by reacting the mixture at 360° C. for 30 minutes and at a reduced pressure of 1 mm Hz to remove the phenol produced in the reaction. Preferably the reaction temperature is raised further to 380° C. to build molecular weight. The resulting polymer has a glass transition temperature of 154° C. and a melting temperature of 346° C.

What is claimed:

1. A polycarbonate capable of forming an anisotropic melt consisting essentially of first units of the formula:

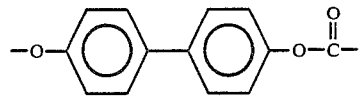

chemically combined with second units of the formula:

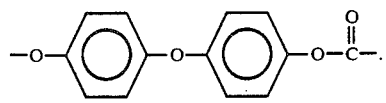

2. The polycarbonate of claim 1 wherein the first units are present at a level of from 50 mole percent to 80 mole percent based on the total moles of first and second units and said second units are present at a level of from 20 mole percent to 50 mole percent based on the total moles of first and second units.

3. The polycarbonate of claim 1 wherein the first units are present at a level of from 60 mole percent to 75 mole percent based on the total moles of first and second units and said second units are present at a level of from 25 mole percent to 40 mole percent based on the total moles of first and second units.

4. The polycarbonate of claim 1 wherein said first units are present at a level of about 70 mole percent based on the total moles of first and second units.

5. A polycarbonate capable of forming an anisotropic melt which is the reaction product of:
   (a) 4,4'-dihydroxybiphenyl
   (b) 4,4'-dihdroxyphenylether (c) diphenyl carbonate consisting of first units of the formula:

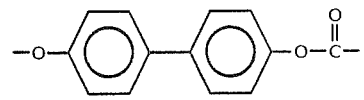

chemically combined with second units of the formula:

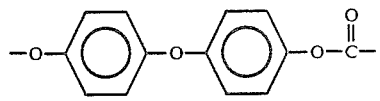

said polymer being endcapped with monovalent phenyl radicals, and where the diphenyl carbonate is present at a level of about 50 mole percent to 55 mole percent based on the total moles of 4,4'-dihydroxybiphenyl, 4,4'-dihydroxyphenylether and diphenyl carbonate.

6. A polycarbonate capable of forming an anisotropic melt which is the reaction product of:
   (a) 4,4'-dihydroxybiphenyl;
   (b) 4,4'-dihydroxyphenylether; and
   (c) diphenylcarbonate.

7. The polycarbonate of claim 6 wherein said 4,4'-dihydroxybiphenyl is present at a level of from 50 mole percent to 80 mole percent based on the total moles of 4,4-dihydroxybiphenyl and 4,4'-dihydroxyphenylether.

8. The polycarbonate of claim 6 wherein said 4,4'-dihydroxybiphenyl is present at a level of from 60 mole percent to 75 mole percent based on the total moles of 4,4-dihydroxybiphenyl and 4,4'-dihydroxyphenylether.

9. The polycarbonate of claim 6 wherein said 4,4'-dihydroxybiphenyl is present at a level of from about 70 mole percent of 4,4-dihydroxybiphenyl and 4,4'-dihydroxyphenylether.

* * * * *